Aug. 12, 1947.  F. H. MUELLER ET AL  2,425,483
PIPE LINE STOPPER
Filed April 25, 1945  3 Sheets-Sheet 1
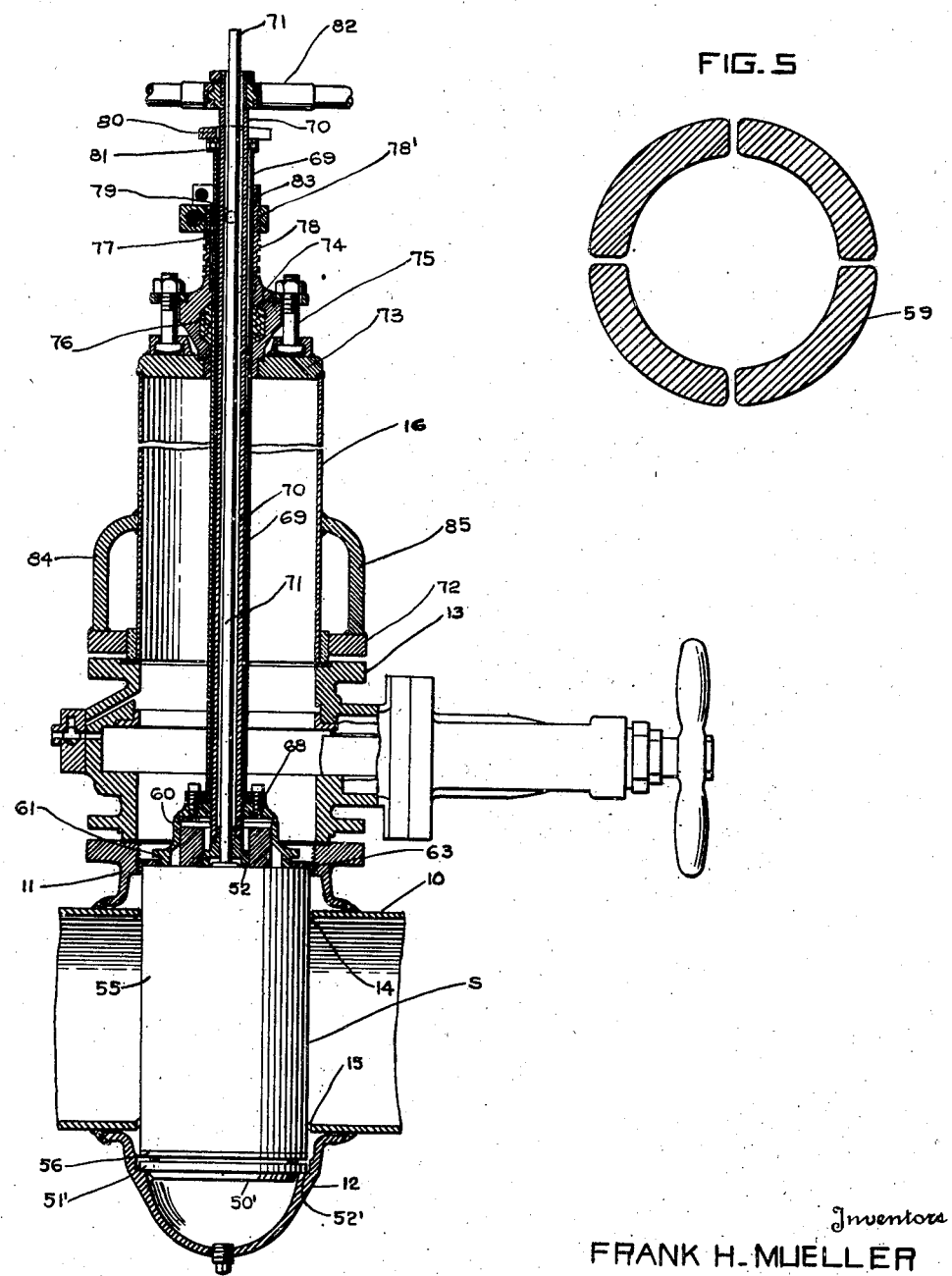
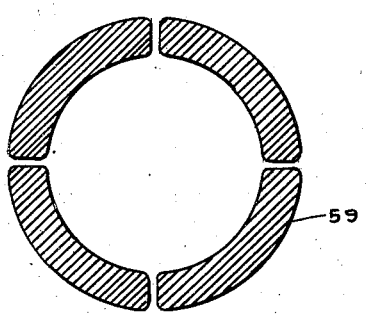
Inventors
FRANK H. MUELLER
JOHN J. SMITH

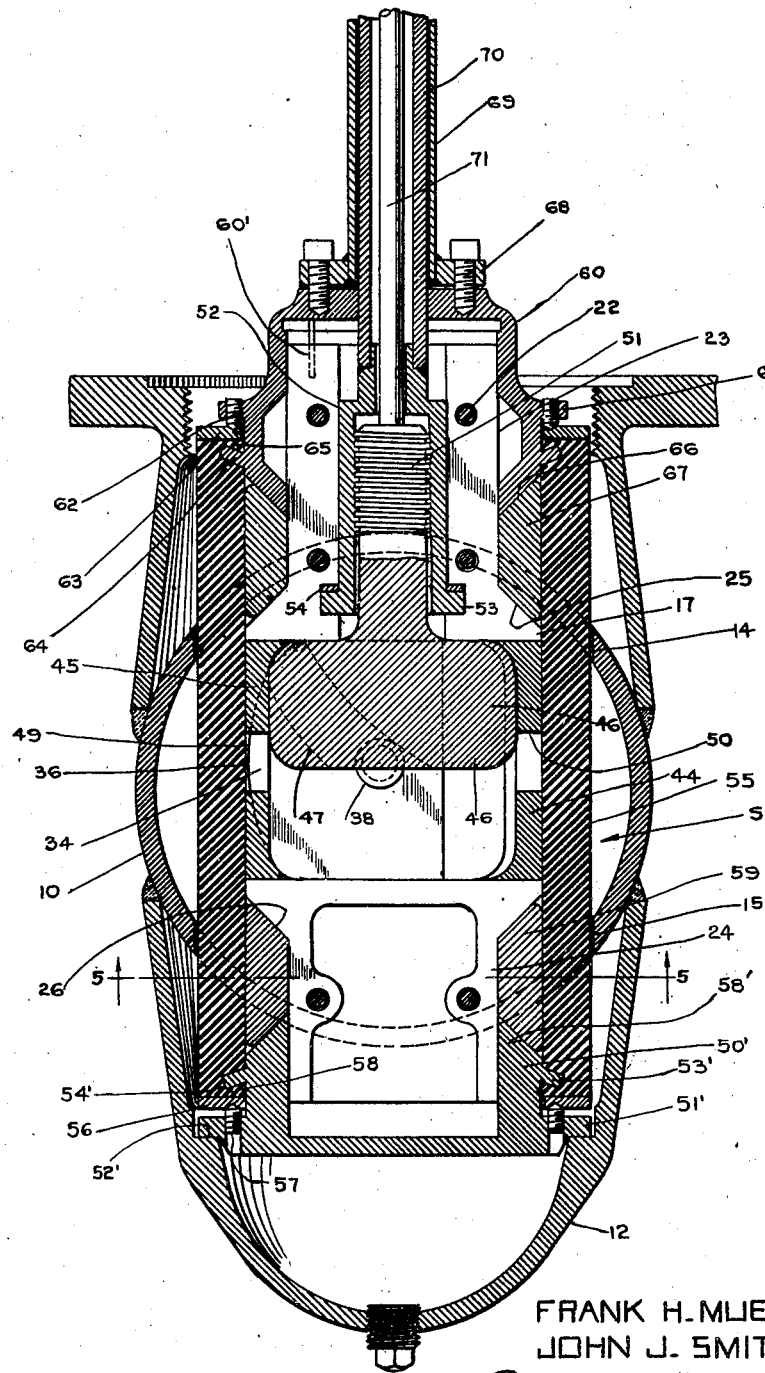

Aug. 12, 1947.  F. H. MUELLER ET AL  2,425,483
PIPE LINE STOPPER
Filed April 25, 1945  3 Sheets-Sheet 3

Inventors
FRANK H. MUELLER
JOHN J. SMITH
By Cushman Darby Cushman
Attorneys

Patented Aug. 12, 1947

2,425,483

UNITED STATES PATENT OFFICE 2,425,483

PIPE-LINE STOPPER

Frank H. Mueller, Hot Springs National Park, Ark., and John J. Smith, Decatur, Ill., assignors to Mueller Co., Decatur, Ill., a corporation of Illinois Application April 25, 1945, Serial No. 590,142

10 Claims. (Cl. 138—94)

This invention relates to pipe line stoppers of the type adapted to be inserted laterally in a main. In the use of such stoppers, at least one lateral opening is formed in the main for the introduction of a stopper and it is the principal object of the present invention to provide improved means for sealing off such an opening.

Figure 3:
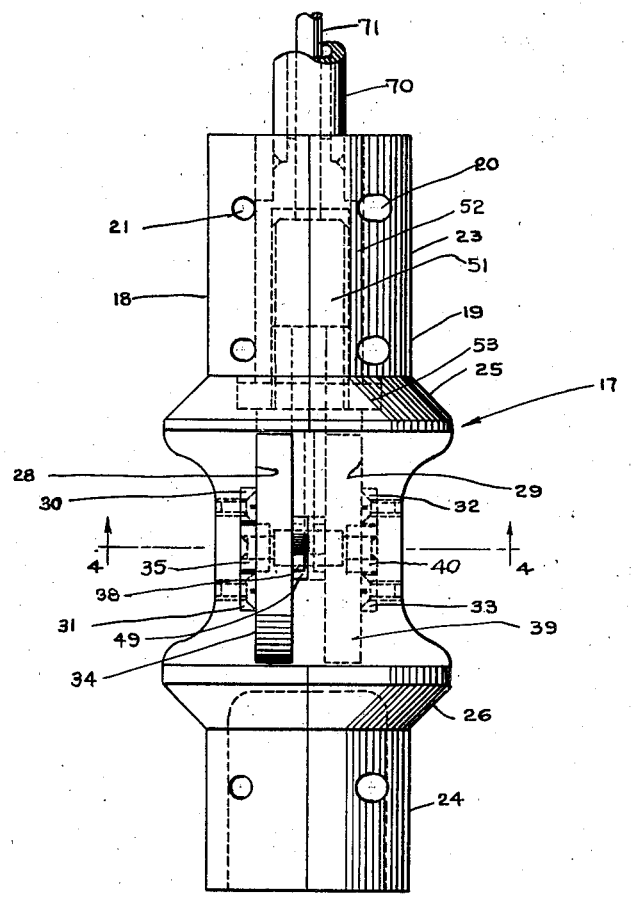
Figure 4:
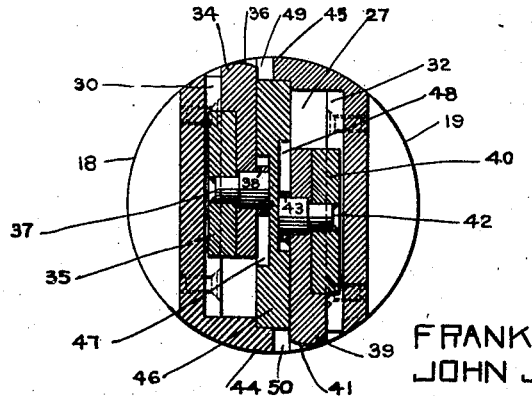

A practical embodiment of the invention is shown by way of example in the accompanying drawings in which Figure 1 is an axial section of a portion of a main and of the new stopper in association therewith, Figure 2 is an axial section of the stopper taken at right angles to the main, Figure 3 is an elevation of a body or core member forming a part of the stopper, Figure 4 is a section substantially on line 4—4 of Figure 3, and Figure 5 is a section on line 5—5 of Figure 2 of a split ring which appears in axial section in Figure 2.

Referring to Figure 1, reference numeral 10 designates a main having top and bottom fittings 11 and 12 welded thereto, a control valve 13, here shown as a slide valve, being secured to the top fitting 11. The fittings 11 and 12 are like those disclosed in the patent to Larry et al., No. 2,171,575 of September 5, 1939, except that the fitting 11, instead of being externally threaded, is provided with a top flange for the accommodation of the control valve which is like that shown in the patent to Mueller et al., No. 2,285,779 of June 9, 1942. The main is shown as having top and bottom openings 14 and 15 of the same diameter which, in this case, is substantially less than the inside diameter of the main. After forming the openings 14 and 15 in known manner, by means of a boring machine mounted on valve 13, the machine is removed and the barrel or bonnet 16, which carries the stopper of the present invention is secured on top of the valve.

The new stopper S comprises an elongated body 17, Figures 2 and 3, which comprise two axially split sections 18 and 19 secured together by headed screws introduced through bores as at 20 and threaded into bores 21, the screws being indicated at 22, Figure 2. The body comprises a cylindrical top neck portion 23 and a cylindrical bottom neck portion 24 inwardly of which are inclined or conical shoulders 25 and 26, respectively. Between the shoulders the body is provided with a chamber 27, Figure 4, having parallel faces 28 and 29 parallel to the body axis and having set therein parallel guide rails 30, 31 and 32, 33, respectively. A vane 34 is slidable against face 28 and has set therein a block 35 which is slidably guided between rails 30 and 31. The vane has a curved outer edge, as indicated at 36 in Figure 2, curved substantially as the interior of the main, which edge is normally entirely within the projection of the shoulders 25 and 26 as indicated in Figures 2 and 4. Set in vane 34 and block 35 is a stud 37 which projects beyond the inner face of vane 34 and carries a roller 38.

A vane 39 is slidable against face 29 and has set therein a block 40 slidably guided between rails 32 and 33, the outer edge 41 of the vane being curved substantially as the inside of the main. Set in vane 39 and block 40 is a stud 42 which projects beyond the inner face of vane 39 and carries a roller 43. Body portions 18 and 19 have longitudinally rabbeted extensions 44 and 45 which guide a block or slide 46 for vertical reciprocation. Slide 46 has diagonally extending grooves 47 and 48 on its opposite sides in which rollers 38 and 43 are respectively engaged. The outline of groove 47 is shown in Figure 2 and groove 48 extends oppositely. When the slide is in its uppermost position as shown in Figure 2, the vanes are retracted. Upon moving the slide downwardly, the vanes are simultaneously projected outwardly. Reference numeral 49, Figures 2 and 4, designates a recess in the edge of extension 45 large enough to pass roller 38. When the slide is in its lowermost position, vane 34 can be readily assembled by sliding it into its slot, roller 38 passing through recess 49 and into the upper end of groove 47. Extension 44 has a slot 50 for the same purpose.

Slide 46 has an upwardly extending threaded shank 51 engaged in a sleeve 52 which is journalled in neck 23 and has a bottom annular flange 53 received in an annular groove in the neck, a thrust washer 54 being interposed between the flange and the top wall of the groove, Figure 2.

Reference numeral 50′, Figures 1 and 2, designates a bottom cap which slidably receives the neck 24 of the body. The cap has a flange 51′ adapted to rest on a ledge 52′ of fitting 12. The cap is also provided with a flange 53′ above and inclined toward the flange 51′ and received in a mating groove 54′ of a cylindrical rubber sleeve 55, and by the term "rubber" we mean any yieldable or resilient rubber-like material, natural or synthetic. As here shown, sleeve 55 is open at both ends. A split ring 56 is engaged with the lower extremity of the sleeve and is adjustable by means of screws 57 toward flange 53′ so as to clamp the lip portion 58 of the tube and thus secure the latter and cap 50' together.

The upper end of the cap has a face 58' spaced from and inclined oppositely to the shoulder 26 and between the two is disposed a split metal ring 59 having side faces inclined complementarily to the face 58 and the face of shoulder 26. As shown in Figure 5, the ring 59 is formed in four equal segments whose ends are normally slightly spaced.

Reference numeral 60 designates a top cap slidable on the neck 23 and having a flange 61 provided with threaded bores in which are engaged screws 62 which force a ring 63 toward a flange 64 set in the upper portion of sleeve 55 so that the lip 65 is clamped in the same manner as the lip 58. Cap 60 has a lower surface 66 inclined oppositely to the shoulder 25, a ring 67, which may be exactly the same as ring 59, being engaged between the opposed inclined surfaces. Reference numeral 69' designates a spline between cap 60 and neck 23. In the relation of parts shown in Figure 2, sleeve 55 is substantially cylindrical and has an outside diameter slightly less than the diameter of the openings 14 and 15 in the main so as to be freely insertable downwardly until flange 51' of the bottom cap rests on shoulder 52' of fitting 12.

Fixed to the top of cap 60 is a flange 68 to which is fixed a tube 69 coaxially with the stopper. Rotatable within tube 69 is a tube 70 which is fixed to the top of sleeve 52 and within tube 70 is a rod 71 which is fixed to the shank 51 of slide 46.

Referring to Figure 1, the barrel 16 has a bottom flange 72 bolted to a top flange of valve 13. The upper end of the barrel is closed by a top wall 73 fixed thereto and by a block 74 set in and sealed in an axial opening in the wall, being secured thereto by bolts as at 75. Block 74 has an axial bore slidably receiving tube 69 and sealed with the latter by an annular packing 76, a spline 77 being disposed between a neck portion 78 of the block and the tube. Neck 78 is threaded externally and has engaged therewith a handled feed nut 78' having a yoke pivoted thereto on a bolt 79, the yoke having a cross portion 80 recessed so as to be swingable into straddling relation to tube 70 for engagement with a thrust bearing 81 at the end of tube 69. This feed means is conventional, being shown, for example, in the patent to Larry et al., No. 2,171,575 of September 5, 1939. Fixed to the upper end of tube 70 is a reversible ratchet 82.

For transportation purposes the yoke is released from bearing 81 and the stopper S is pulled completely into the barrel 16 and held by means of a clamp 83 which bears against the top of the feed nut. When the stopper is to be applied, the barrel is set on valve 13 with its diametrically opposite handles 84 and 85 extending exactly axially of the main or, if preferred, they may be arranged at 90° from their illustrated disposition so that when they are in a plane at right angles to the main the proper disposition of the stopper in the main will be indicated. If the barrel is disposed so that handles 84 and 85 extend axially of the main, the vanes 34 and 39 are in planes transversely of the main, being thus positively maintained by the splines 60' and 77. After flange 72 is bolted to the top flange of valve 13, clamp 83 is released, tube 69 is pushed down to engage the bottom cap with the bottom fitting as shown in Figures 1 and 2, and the yoke is applied to bearing 81. By threading down on the feed nut 78', cap 60 will be lowered, thus expanding ring 67 and also lowering somewhat the body 17 to expand ring 59. When ring 67 is fully expanded, it will slide down within sleeve 55 until ring 59 is fully expanded and the disposition of the rings is such that when this occurs the sleeve 55 will have been bulged peripherally into contact with the edges of the main openings 14 and 15 so that the openings are completely sealed off. Ratchet 82 is now operated to lower slide 46 so that vanes 34 and 39 are projected outwardly to conform the sleeve against the opposite walls of the main between the main openings so that a complete barrier is provided. The upper end of rod 71 is marked in relation to the top of tube 70 so that when the mark comes to the level of the top of the tube the operator will know that the vanes have been sufficiently projected.

When the stopper is to be removed, the vanes are first retracted by threading slide 46 upwardly and then moving cap 60 upwardly by disengaging the yoke and pulling upwardly on tube 69, sleeve 55 contracting rings 59 and 67 so that the stopper is moved freely upwardly into barrel 16. The portion of the stopper body between shoulders 25 and 26 has the same diameter as the latter transversely of the main but on the up and down sides (referring to the direction of flow in the main) this portion is relieved, as shown in Figure 3, so that the sleeve can collapse into these spaces when expanded by the projected vanes.

The described structure is given by way of illustration and it will be understood that the invention contemplates, as within its scope, variations in the form and relation of parts coming under the following claims.

We claim:

1. A pipe line stopper insertable through a side wall opening in a main which has a substantially larger inside diameter than said opening, said stopper comprising an elongated body, a rubber sleeve surrounding said body, means in said body oppositely projectible to substantially conform said sleeve to the opposite inner walls of the main, means for projecting said projectible means, a split ring surrounding said body within said sleeve at one end of said projectible means, and means for expanding said ring to bulge said sleeve peripherally to seal the side wall opening, the stopper including means for establishing a seal between it and the main opposite the opening, whereby the stopper is capable of establishing a complete seal across the main at the opening.

2. A pipe line stopper insertable through a side wall opening in a main which has a substantially larger inside diameter than said opening, said stopper comprising an elongated body, a rubber sleeve surrounding said body, means in said body oppositely projectible to substantially conform said sleeve to the opposite inner walls of the main, a peripheral shoulder on said body within said sleeve at one end of said projectible means, a split ring on said shoulder within said sleeve, a cap slidable on said body and engaging the other side of said ring, means whereby movement of said cap toward said shoulder causes circumferential expansion of said ring whereby to bulge said sleeve peripherally to seal the side wall opening, and means for moving said cap toward said shoulder, the stopper including means for establishing a seal between it and the main opposite the opening, whereby the stopper is capable of establishing a complete seal across the main at the opening.

3. A pipe line stopper insertable through a side wall opening in a main which has a substantially larger inside diameter than said opening, said stopper comprising an elongated body, a rubber sleeve surrounding said body, means in said body oppositely projectible to substantially conform said sleeve to the opposite inner walls of the main, a peripheral inclined shoulder on said body within said sleeve at one end of said projectible means and inclined upwardly away from the latter, a split ring on said shoulder within said sleeve and having a side surface inclined complementarily to and engaging said shoulder, a cap slidable on said body and engaging the other side of said ring, the engaging surfaces of said cap and ring being inclined oppositely to the engaging surfaces of said ring and shoulder, and means for moving said cap toward said shoulder so that said engaged surfaces act to wedge said ring circumferentially outwardly whereby to bulge said sleeve peripherally to seal the side wall opening, the stopper including means for establishing a seal between it and the main opposite the opening, whereby the stopper is capable of establishing a complete seal across the main at the opening.

4. A stopper according to claim 2 wherein said cap has a portion extending within the sleeve extremity and is secured to the latter.

5. A stopper according to claim 2 wherein said cap has a portion extending within the sleeve extremity and the latter has a circumferential internal groove, and wherein the cap has a flange engaged in said groove.

6. A stopper according to claim 2 wherein said cap has a portion extending within the sleeve extremity and the latter has a circumferential internal groove, and wherein the cap has a flange engaged in said groove and is provided with means for clamping the sleeve extremity against said flange whereby to hold the cap and sleeve together.

7. A pipe line stopper insertable in diametrically extending relation through opposed side openings in a main which has a substantially larger internal diameter than said openings, said stopper comprising an elongated body, a rubber sleeve surrounding said body, means in said body oppositely projectible to substantially conform said sleeve to the opposite inner walls of the main, means for projecting said projectible means, split rings surrounding said body within said sleeve at the ends of said projectible means, and means for expanding said rings to bulge the sleeve peripherally to seal the opposed openings, whereby the stopper is capable of establishing a complete seal across the main at the openings.

8. A pipe line stopper insertable in diametrically extending relation through opposed side openings in a main which has a substantially larger internal diameter than said openings, said stopper comprising an elongated body, a rubber sleeve surrounding said body, means in said body oppositely projectible to substantially conform said sleeve to the opposite inner walls of the main, means for projecting said projectible means, peripheral shoulders on said body at the ends of said projectible means, split rings on said shoulders respectively and within said sleeve, caps slidable on the ends of the body respectively, means whereby approach of said caps and the adjacent shoulders causes circumferential expansion of said rings whereby to bulge said sleeve peripherally to seal the side wall openings, and means for causing said caps and the adjacent shoulders to approach each other, whereby the stopper is capable of establishing a complete seal across the main at the openings.

9. A pipe line stopper insertable in diametrically extending relation through opposed side openings in a main which has a substantially larger internal diameter than said openings, said stopper comprising an elongated body, a rubber sleeve surrounding said body, means in said body oppositely projectible to substantially conform said sleeve to the opposite inner walls of the main, means for projecting said projectible means, peripheral shoulders on said body at the ends of said projectible means and inclined inwardly and away from the latter, split rings each having a complementarily inclined side face engaged with one of said shoulders, the other side face of each ring being inclined oppositely to its shoulder engaging face, caps slidable on the ends of the body respectively and having complementarily inclined faces engaging said other side faces of the rings, and means for causing said caps and adjacent shoulders to approach each other so that said rings are expanded to peripherally bulge said sleeve to seal the openings, whereby the stopper is capable of establishing a complete seal across the main at the openings.

10. A stopper according to claim 8 wherein said caps have portions extending within the ends of said sleeve and secured thereto.

FRANK H. MUELLER.
JOHN J. SMITH.

REFERENCES CITED

The following references are of record in the file of this patent:

UNITED STATES PATENTS

| Number | Name | Date |
| --- | --- | --- |
| 2,285,392 | Cline | June 9, 1942 |
| 705,059 | Flynn | July 22, 1902 |
| 253,691 | Fowler | Feb. 14, 1882 |
| 2,285,393 | Cline | June 9, 1942 |